United States Patent
Zhakov

(10) Patent No.: US 10,582,054 B2
(45) Date of Patent: *Mar. 3, 2020

(54) DYNAMIC RECOMMENDATION OF ROUTING RULES FOR CONTACT CENTER USE

(71) Applicant: GENESYS TELECOMMUNICATIONS LABORATORIES, INC., Daly City, CA (US)

(72) Inventor: Vyacheslav Zhakov, Burlingame, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/611,753

(22) Filed: Jun. 1, 2017

(65) Prior Publication Data

US 2017/0272574 A1 Sep. 21, 2017

Related U.S. Application Data

(63) Continuation of application No. 13/684,053, filed on Nov. 21, 2012, now Pat. No. 9,674,356.

(51) Int. Cl.
  *H04M 3/51* (2006.01)
  *G06Q 30/02* (2012.01)
  *G06Q 30/00* (2012.01)
(52) U.S. Cl.
  CPC ........ *H04M 3/5175* (2013.01); *G06Q 30/016* (2013.01); *G06Q 30/02* (2013.01); *H04M 3/5183* (2013.01); *H04M 2203/402* (2013.01)
(58) Field of Classification Search
  CPC ......... H04M 3/5175; H04M 2203/401; H04M 2203/402
  See application file for complete search history.

(56) References Cited

U.S. PATENT DOCUMENTS

| | | | |
|---|---|---|---|
| 6,233,332 B1 | 5/2001 | Anderson et al. | |
| 6,700,971 B1* | 3/2004 | Cohen | H04M 3/5233 379/265.05 |
| 6,898,277 B1 | 5/2005 | Meteer et al. | |
| 8,226,477 B1* | 7/2012 | Machado | G06Q 10/105 273/108.1 |
| 8,938,063 B1* | 1/2015 | Hackbarth | G06Q 10/00 379/265.03 |
| 9,020,920 B1 | 4/2015 | Haggerty et al. | |
| 2007/0198323 A1 | 8/2007 | Bourne et al. | |
| 2008/0095355 A1 | 4/2008 | Mahalaha et al. | |

(Continued)

FOREIGN PATENT DOCUMENTS

WO    2010027671 A2    3/2010

OTHER PUBLICATIONS

Chinese Patent Office Action with English Translation for Application No. 201380070895.X, dated Dec. 30, 2016, 25 pages.

(Continued)

*Primary Examiner* — Nafiz E Hoque

(57) ABSTRACT

A machine learning system and method for contact center use. Activities associated with a plurality of contact centers are monitored and a knowledge base is updated based on the monitored activities. An outcome for a particular contact center may be predicted based on monitored interactions for the particular contact center, and based on information in the knowledge base. An output is then generated based on the predicted outcome.

14 Claims, 8 Drawing Sheets

(56) References Cited

U.S. PATENT DOCUMENTS

| | | | |
|---|---|---|---|
| 2008/0260128 A1* | 10/2008 | Conway | H04M 3/5232 |
| | | | 379/201.02 |
| 2008/0279363 A1 | 11/2008 | Zernik et al. | |
| 2010/0111286 A1* | 5/2010 | Chishti | H04M 3/5232 |
| | | | 379/265.12 |
| 2010/0165977 A1 | 7/2010 | McCord | |
| 2010/0274637 A1* | 10/2010 | Li | G06Q 10/06 |
| | | | 379/265.06 |
| 2010/0332287 A1* | 12/2010 | Gates | G06F 17/277 |
| | | | 705/7.32 |
| 2011/0299676 A1* | 12/2011 | Hanson | G06Q 30/02 |
| | | | 379/265.03 |
| 2012/0084112 A1 | 4/2012 | Bagchi et al. | |

OTHER PUBLICATIONS

Extended European Search Report for Application No. 13856408.3, dated May 19, 2016, 6 pages.

International Search Report and Written Opinion for Application No. PCT/US2013/017339, dated Jan. 29, 2014, 13 pages.

Chinese Patent Office Second Office Action with English Translation for Application No. 201380070895.X, dated Nov. 11, 2017, 7 pages.

European Office Action for Application No. 13 856 408.3, dated Mar. 23, 2018, 6 pages.

* cited by examiner

DYNAMIC RECOMMENDATION OF ROUTING RULES FOR CONTACT CENTER USE

CROSS-REFERENCE TO RELATED APPLICATION

This application is a continuation of U.S. patent application Ser. No. 13/684,053, filed on Nov. 21, 2012, now U.S. Pat. No. 9,674,356, the content of which is incorporated herein by reference.

BACKGROUND

It is desirable to aid companies to deploy their contact center operations as efficiently and successfully as possible. However, one of the items that may take time to implement for a new contact center is an effective call and/or interaction routing strategy. Before any programming of the routing strategy can be done, the contact center must generally identify what the best practices are for this particular type of contact center, what types of services are to be provided, what are the needs of the contact center, and the business logic that will work best for the contact center. The identification of the business logic itself, aside from its programming, may be a daunting task to entities that are not familiar with call centers and their setup. Much research may be needed before identifying the business logic that will be used, adding further delays to a successful deployment of a contact center, and resulting in suboptimal solutions.

Contact centers with existing routing strategies may also want to reevaluate such strategies to ensure that such strategies remain effective. Such contact centers may want to modify their routing strategies or take other remediation actions in the event that customer dissatisfaction or other routing deficiencies are detected.

Accordingly, what is desired is a system and method for recommending call and/or interaction routing strategies to new and existing contact centers that are deemed to be desirable for such contact centers. It is also desirable to have a system and method for deploying contact centers efficiently without requiring skilled technicians, nor hardcoded routing strategies that are difficult to generate, deploy, and modify.

SUMMARY

Embodiments of the present invention are directed to a machine learning system and method for contact center use. Activities associated with a plurality of contact centers are monitored and a knowledge base is updated based on the monitored activities. An outcome for a particular contact center may be predicted based on monitored interactions for the particular contact center, and based on information in the knowledge base. An output is then generated based on the predicted outcome.

The monitored activities may be customer interactions handled by the plurality of contact centers, an amount of time a call is put on hold prior to being routed to an agent, or a number of transfers made during a call.

The predicted outcome may be feedback from a customer associated with the monitored interaction indicative of lack of satisfaction by the customer, or abandonment of the call.

According to one embodiment, the output is a recommended routing strategy.

According to one embodiment, the outcome for the particular contact center may be validated via simulation based on prior interaction data.

According to one embodiment, the knowledge base includes a machine learning model, and the updating includes adjusting parameters to the machine learning model based on the monitored activities. The outcome for the particular contact center may be predicted based on the machine learning model.

Embodiments of the present invention are also directed to a method for recommending routing strategies to contact centers. The method includes assessing a current routing strategy for a particular contact center; updating parameters of one or more reference models in a knowledge base based on the assessed routing strategy; determining whether the current routing strategy is favorable or not; automatically selecting a candidate routing strategy from the knowledge base based on the determination and the one or more reference models; and recommending the candidate routing strategy for the contact center.

According to one embodiment, the method further includes validating the recommended routing strategy via simulation based on prior customer interaction data.

The recommended routing strategy may be deployed automatically or in response to a user command.

According to one embodiment, the assessing includes identifying business outcomes from prior customer interactions, and the determining that the current routing strategy is unfavorable is based on a determination that the identified business outcomes are not favorable.

A person of skill in the art should recognize that the machine learning system and method according to the various embodiments allow the acquisition of knowledge from operations of multiple contact centers, and allow the acquired knowledge to be leveraged to optimize performance and solve problems encountered by other contact centers.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to a multi-tenant contact center operation that is configured to store tenant configuration and interaction information, routing logic, and other data such as, for example, service level agreements, staffing and scheduling information, agent skills assignment information, customer segment data, service type identifiers, and the like, and use the tenant configuration and interaction information to predict major call outcomes, suggest routing rules, rate contact centers, detect and alert anomalies, recommend routing actions, and the like. According to one embodiment, a prediction/rating server is configured to invoke a machine learning algorithm to automatically predict an outcome based on configuration and interaction data gathered for the contact center. Machine learning may also be invoked to create and maintain/optimize a knowledge base and reference/machine learning models in that knowledge base for making the predictions. The prediction/rating server may also rate the contact center based on the gathered data. The interaction and configuration information may include, without limitation, a number of calls received, a number of calls that were answered, number of calls that were abandoned, amount of time calls were spent on hold before being serviced, a number of transfers made during a particular call, business outcomes of calls and other interactions, customer satisfaction resulting from calls and other interactions, agent satisfaction information, and the like.

A recommendation server is configured to analyze the configuration and interaction data, rating/scores assigned to contact centers, outcomes predicted for the contact centers, and other data associated with the contact centers, and suggest routing rules to new and existing contact centers based on the analysis. The suggested routing rules may be aimed to help contact centers receive higher approval from calling end users.

Figure 1:
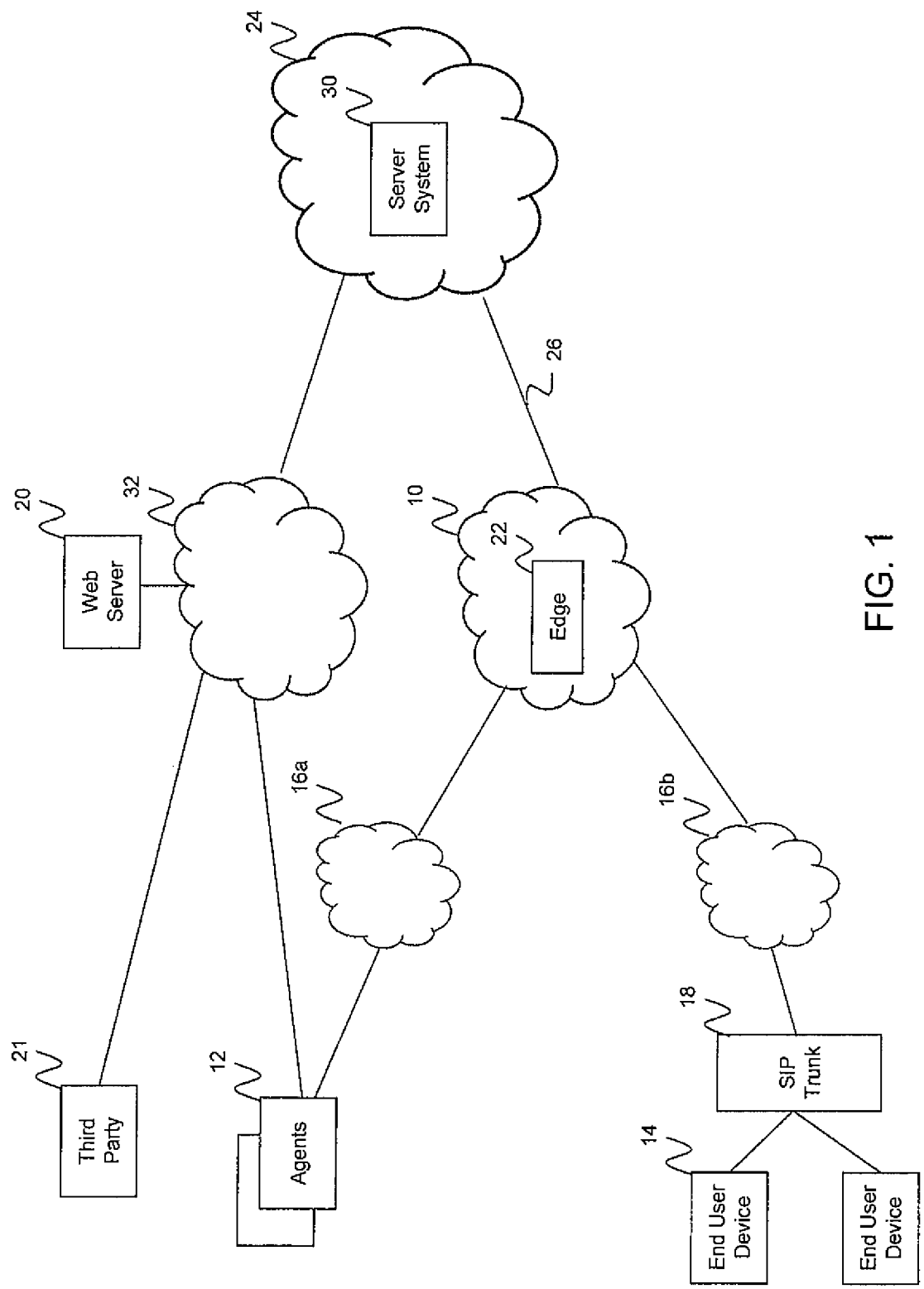
FIG. 1 is a schematic block diagram of a system for dynamic generation of routing rules according to one embodiment of the invention.

FIG. 1 is a schematic block diagram of a system for dynamic recommendation of routing rules according to one embodiment of the invention. The system includes a communications network 10 which, according to one embodiment, is dedicated to facilitate calls between agents 12 of various contact centers, and end users 14. The calls may include, for example, VoIP communication or any other real-time media communication conventional in the art. The calls are controlled by any signaling protocol configured to control communication sessions over the Internet, such as, for example, session initiation protocol (SIP), H.323, and the like.

According to one embodiment, the dedicated communications network 10 includes an edge device 22 such as, for example, a session border controller for controlling signaling and media streams involved in setting up, conducting, and tearing down voice conversations or other media communications. Any session border controller conventional in the art may be used to implement the edge device 22. In this regard, the session border controller includes a processor executing software instructions and interacting with other system components to control voice or other media communications. The session border controller also includes an addressable memory for storing software instructions to be executed by the processor. The memory is implemented using a standard memory device, such as a random access memory (RAM).

The dedicated communications network 10 is coupled to one or more private networks 16a, 16b (collectively referenced as 16). The private networks 16 may be managed by one or more telecommunications companies that provide quality of service guarantees for VoIP calls traversing the private networks according to provider policies and limits of service ordered by its customers. According to one embodiment, the private networks 16 implement MPLS (Multi-Protocol Label Switching) for transmitting VoIP communication. Although MPLS is used as an example, a person of skill in the art should recognize that any other mechanism in addition or in lieu of MPLS may be used for ensuring quality of service guarantees, bit rates, and bandwidth for calls traversing the private networks. Due to the quality of service guarantees provided by the private networks 16, consistent call quality and security can generally be expected for those calls while traversing the private networks.

End users 14 utilize end user devices (e.g. VoIP phones, computers, smart phones, etc) to access the private network 16b for VoIP communication via a SIP trunk equipment 18. Although the SIP trunk equipment 18 is used according to one embodiment for accessing the private network 16b, a person of skill in the art should recognize that any other device for allowing the end user devices to access to the private network 16b for VoIP communication or other types of communication (e.g. email, chat, web-based communication, etc.) may be used in addition or in lieu of the SIP trunk. According to one embodiment, access to the private network 16b may also be via WebRTC, Skype, or via other networking systems (e.g. IP Multimedia Subsystem (IMS), public land mobile network (PLMN), and the like.

According to one embodiment, the remote computing environment 24 is a cloud computing environment that allows the sharing of resources and the provision of services over a network. In other embodiments, the remote computing environment provides resources used by a managed services provider (MSP) to provide services to various contact centers. Although the computing environment 24 is referred to as a remote computing environment, a person of skill in the art should recognize that the computing environment may be co-located or merged with the dedicated communications network 10. In that case, the computing environment 24 is not remote to the dedicated communications network. In other embodiments, the computing environment 24 is co-located or merged with or any other network environment conventional in the art.

According to one embodiment, instead of hosting all contact center applications at servers located in the dedicated communications network, all or a portion of the applications are hosted by a server system 30 in the remote computing environment 24. The contact center applications may then be provided to multiple tenants as a software as a service (SaaS). Of course, the applications may also be hosted in other locations, including the dedicated communications network 10 or any other network conventional in the art, without departing from the scope and spirit of the present invention. The contact center applications include but are not limited to applications that provide VoIP signaling, voice treatments (e.g. interactive voice response applications), multi-party calls (e.g. conference calls), and the like.

According to one example embodiment, tenants 12 engage in data communication with the remote computing environment 24 over a public wide area network 32 such as, for example, the Internet. According to one example embodiment, all tenant user interfaces including agent desktop UI and tenant administrative UI are hosted by a third party web platform 20 over the Internet. According to one example embodiment, a specialized application running on the third party web platform utilizes third party APIs to manage the tenant user interfaces and integrate with the third party infrastructure (e.g. third party databases).

According to one example embodiment of the invention, various third party developer devices 21 are also coupled to the remote computing environment 24 over the Internet. The third party developer devices may be invoked to generate new business logic and upload a template and associated metadata defining the business logic to the remote computing environment. Once uploaded, the new templates may be made available for use by different contact centers. In this manner, different entities may be involved in extending the routing capabilities offered by existing templates.

When a contact center receives an inbound call or engages in an outbound call campaign, all or a portion of the call is serviced by one or more contact center applications in the remote computing environment 24. According to one embodiment, the contact center applications for a particular tenant may be transitioned/moved from one remote computing environment 24 to another, in the same or different region, in a seamless manner. The assignment of the applications to tenants may be dynamically controlled based on demand and availability of the applications. The contact center applications may also be shared amongst different contact centers.

Media traffic may be exchanged between customers/agents and the server system 30 in response to invoking the contact center applications in the remote computing environments 24. A majority of the voice communication, however, is conducted over a media path that connects the agents and customers over the private networks 16, but does not traverse the remote computing environment 24. Thus, the communication that traverses the media path is generally not affected by any potential traffic or unhealthy status of the network connection 26 between the dedicated communications network 10 and the remote computing environment 24. In the embodiment where cloud servers are utilized, the system in FIG. 1 may be implemented as a hybrid cloud system where infrastructure and applications for handling calls to and from a contact center are distributed between the dedicated communications network 10 (controlled by a private enterprise) and cloud servers in the remote computing environment 24 (controlled by a public service provider/operator). In some embodiments, the system of FIG. 1 may be implemented in such a way that the infrastructure and applications are both controlled by a public service provider/operator. Also, in some embodiments, one or more of the contact center applications on the cloud servers dedicated to particular tenants and not shared across various tenants. Of course a mix of shared and dedicated contact center applications may be deployed.

Although embodiments of the present invention are described as being implemented in a hybrid cloud environment, a person of skill in the art should recognize that the system may also be implemented using solely a public or private cloud environment. Also, instead of engaging in VoIP communication with applications in the remote computing environment via the private networks 16 and the dedicated communications network 10, the VoIP communication or other types communication (e.g. email, chat, web-based communication, etc.) may be conducted over the public Internet (not shown). In other embodiments, no cloud technology is used at all.

Figure 2:
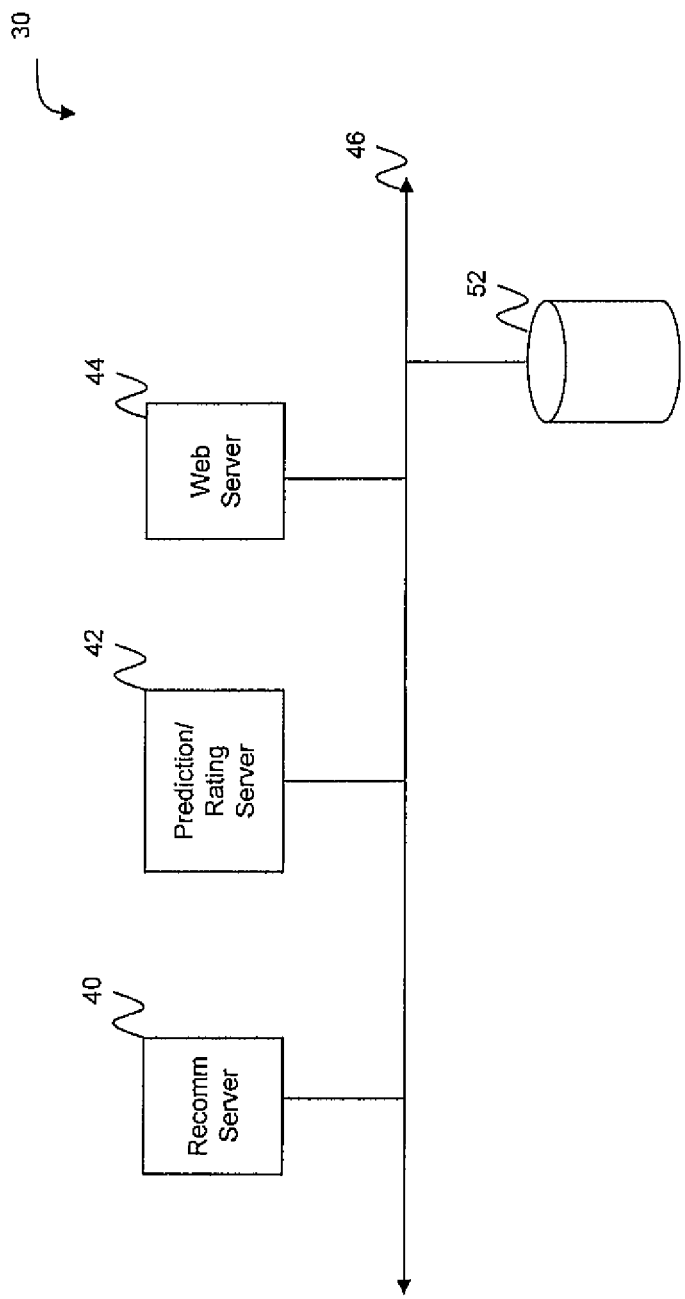
FIG. 2 is a more detailed schematic block diagram of a server system according to one exemplary embodiment of the invention.

FIG. 2 is a more detailed schematic block diagram of the server system 30 in the remote computing environment 24 according to one exemplary embodiment of the invention. The server system 30 includes without limitation, a recommendation server 40, a prediction/rating server 42, and a web server 44. The server system 30 is configured as a learning system for acquiring knowledge from operations of multiple contact centers and leveraging the acquired knowledge to optimize performance and solve problems encountered by other contact centers.

Other call center servers may also be included in the server system 30 as will be apparent to a person of skill in the art, such as, for example, a SIP server, routing server, media server, statistics server, configuration server, and the like. According to one embodiment, the servers 40-44 of the server system are implemented as software components deployed on a single instance of a virtual server. The single instance of the virtual server may utilize standard hardware components such as, for example, one or more processors, disks, memories, and the like. Of course, as a person of skill in the art will understand, each contact center may also be allocated several virtual machines, each of them providing an execution environment for certain applications. More than one virtual machine may also be used for backup purposes (e.g. high availability and disaster recovery purposes). The one or more virtual machines are deployed on physical servers, which may be dedicated to specific contact centers or shared among various contact centers. Although the servers 40-44 are assumed to be separate functional units, a person of skill in the art will recognize that the functionality of two or more servers may be combined or integrated into a single server, or further subdivided into additional server components without departing from the spirit of the invention. In addition, although the servers 40-44 of the server system are depicted as being connected over a data communications bus 46, a person of skill in the art should recognize that any communication among the different virtual machines may not be via a local area network if the virtual machines are collocated in a same physical device (e.g. the same physical server. In addition, a person of skill in the art should recognize that the server system 30 is scalable and may include a considerable number of servers 40-44 sharing a set of mass storage devices 52. The mass storage device(s) 52 may store, for example, configuration information, interaction information, ratings/scores, customer survey data, and the like, for each tenant in the system. The mass storage device 52 may also store a knowledge base with information and reference models that are updated/optimized as further knowledge is gained by the system. Thus, the particular implementation of the server system 30 depicted in FIG. 2 is solely for illustration purposes, and do not preclude other arrangements or components that will be evident to a person of skill in the art.

The prediction/rating server 42 may be configured with a machine learning algorithm for monitoring activities of the various tenants and identifying customer satisfaction predictors based on the monitored activities. Any one or more existing machine learning algorithms may be invoked to do the learning, including without limitation, linear regression, logistic regression, neural network, Bayesian network, tree ensembles, and the like. For example, linear regression assumes that there is a linear relationship between input and output variables. If a neural network is employed, the learning may be via a backward error propagation where the error is propagated from an output layer back to an input layer to adjust corresponding weights of inputs to the input layer.

In one simplified example, the prediction/rating server may monitor interaction data and other operational parameters and learn, for example, that call hold times are good predictors of customer satisfaction. The learned customer satisfaction predictors may then be used to predict an outcome for a particular activity, such as, for example, a call routing activity, engaged by a particular contact center.

According to some exemplary embodiments, the learning by the prediction/rating server 42 is used to generate, optimize, and maintain one or more reference models of best practices for a contact center stored in the knowledge base.

The recommendation server 40 may be configured to make optimization suggestions for routing rules or other actions (e.g. recommendations on staffing, scheduling, and skill assignments) to contact centers based on the reference models stored in the knowledge base. For example, the recommendation server 40 may be configured to input, into one or more reference models, data about a new tenant to be deployed, and receive as an output, recommended routing rules, configuration parameters, and the like, for such new tenant. The input may relate to characteristics of the intended contact center, such as, for example, business domain, service offerings, media mix, and the like.

The recommendation server may also be configured to recommend routing rules to existing contact centers subscribed to receive such recommendations, and may include, for example, underperforming contact centers, contact centers with low ratings, and the like. In making recommendations on the routing rules, the recommendation server may also be configured to consider, along with the learning achieved by the machine learning algorithm, customer segments, service types, (virtual) queues, (virtual) route points, and the contact center's business type, to name a few. Of course, the machine learning algorithm may be configured to track such information during the learning process in order to optimize its references models. The actual deployment of the suggested changes may be done by a separate server either on a manual or automated basis.

The web server 44 is configured to interact with the specialized application on the third party web platform 20 for engaging in contact center management activities and/or for conducting other activities typical for a call center agent. The contact center management activities may be, for example, dynamically configuring and/or reconfiguring tenant resources, routing rules, and the like. According to one exemplary embodiment, the web server 44 may provide to the specialized application user-selectable templates stored in the mass storage device 52 for guiding a contact center administrator in devising a routing strategy for the contact center. Each template may provide particular business logic for routing calls. Other templates are also contemplated, such as, for example, templates for guiding a contact center administrator in arranging staffing for the contact center, scheduling agents, assigning skills to such agents, and the like. The templates may together span a multitude of industry verticals for which a contact center may be desired (e.g. finance, retail, medical, etc.). As the administrator picks and chooses the desired template(s) and provides values for the parameters identified by the template(s), those values are stored in the mass storage device in association with the selected template(s) and an identifier for the particular contact center (e.g. contact center telephone number).

Figure 3:
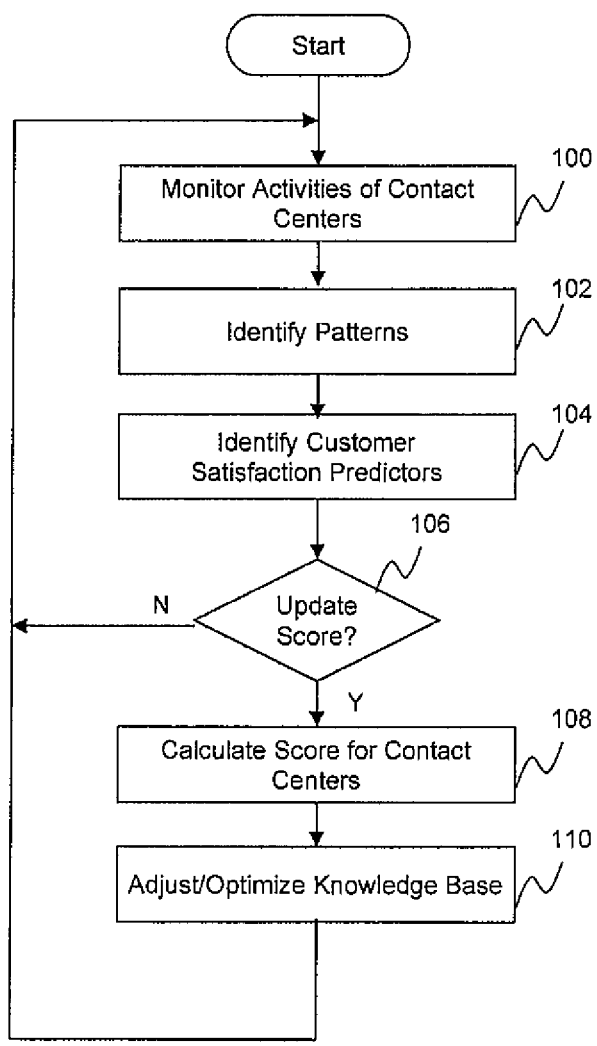
FIG. 3 is a flow diagram of a process executed by a prediction/rating server for rating contact centers and updating a knowledge base according to one exemplary embodiment of the invention.

FIG. 3 is a flow diagram of a process executed by the prediction/rating server 42 for rating contact centers and optimizing the knowledge base according to one exemplary embodiment of the invention. In step 100, the server 42 monitors activities of various contact centers that are deployed in the remote computing environment 24. For example, the predication/rating server 42 may maintain a list of business outcomes/dispositions that may indicate customer satisfaction, and monitor for activities from the various contact centers that lead to one or more of the outcomes in the list. An exemplary outcome may be, for example, call abandonment, a negative customer feedback, and the like. A monitored inbound call leading to one or more of the outcomes may generate operational data such as, for example, the time when the call arrived, the amount of time the call was on hold, the number of transfers that were done during the call, the location of the agent that serviced the call, the skill level of the agent, the total amount of time spent on the call, disposition of the call, and the like.

In step 102, the machine learning algorithm in the prediction/rating server 42 extracts patterns based on the monitored activities and the associated outcomes. For example, the prediction/rating server 42 may learn that 90% of customers calling to an order taking contact center who are placed on hold for more than 30 seconds abandon the call. The prediction/rating server 42 may also learn that 75% of calls that are transferred more than three times receive customer feedback that is less than satisfactory. In yet another example, the prediction/rating server 42 may learn that 80% of calls that are handled by agents having a particular skill level receive customer feedback that is above satisfactory. Correlations may also be made between the learned patterns and the type of contact centers that were involved, such as, for example, the particular industry vertical associated with the contact centers (e.g. finance, retail, medical, etc.), the size of the contact center, and the like.

In step 104, the machine learning algorithm may identify customer satisfaction predictors based on the learned patterns. For example, the machine learning algorithm may identify hold time as a customer satisfaction predictor, and may further correlate this predictor to a particular outcome such as, for example, call abandonment. Other customer satisfaction predictors may include, without limitation, a number of transfers make during a call, agent skill level, and the like.

In step 106, a determination is made as to whether a score, rating, or other evaluation metric (collectively referred to as a score) is to be generated or updated for the contact centers based on the monitored activities and outcomes. The score for a particular contact center may indicate, for example, overall customer satisfaction with the contact center.

In step 108, the prediction/rating server 42 calculates the scores for the contact centers. For example, the prediction/rating server may be configured to evaluate the customer satisfaction predictors encountered for each of the contact centers, and determine the effect of each of the predictors to an overall customer satisfaction score. The scores may be determined on a real time basis based on real time values associated with the customer satisfaction predictors. For example, the hold time for a current call to the contact center may be evaluated to calculate a real time rating for the contact center based on the amount of time the customer is put on hold. For example, a fraction of a point may be deducted from the contact center's overall score if the hold time is above a preset threshold amount that is learned to lead to a negative outcome (e.g. call abandonment, customer complaint, and the like.) The scores may also be determined on a periodic basis based on average values associated with the customer satisfaction predictors. For example, an average hold time, average transfer number, and other average values for the learned customer satisfaction predictors may be calculated for each of the contact centers at the end of the day, and a score updated for each of the contact centers based on the evaluation.

Weights may also be assigned to different types of customer satisfaction predictors based on how likely the predictors in fact predict customer satisfaction. For example, an express customer satisfaction rating provided at the end of a call may be given more weight in calculating the score than other customer satisfaction predictors. Other types of scores or scoring mechanisms are also contemplated. For example, the score for a particular contact center may simply be the score of another similarly situated customer contact center with similar configuration and/or interaction data.

In step 110, the monitored activities, identified patterns, identified customer satisfaction predictors, and/or other observed data may be used to adjust and/or optimize the knowledge base and the stored reference models. For example, the observed data may be used to adjust parameters of one or more reference models.

Figure 4:
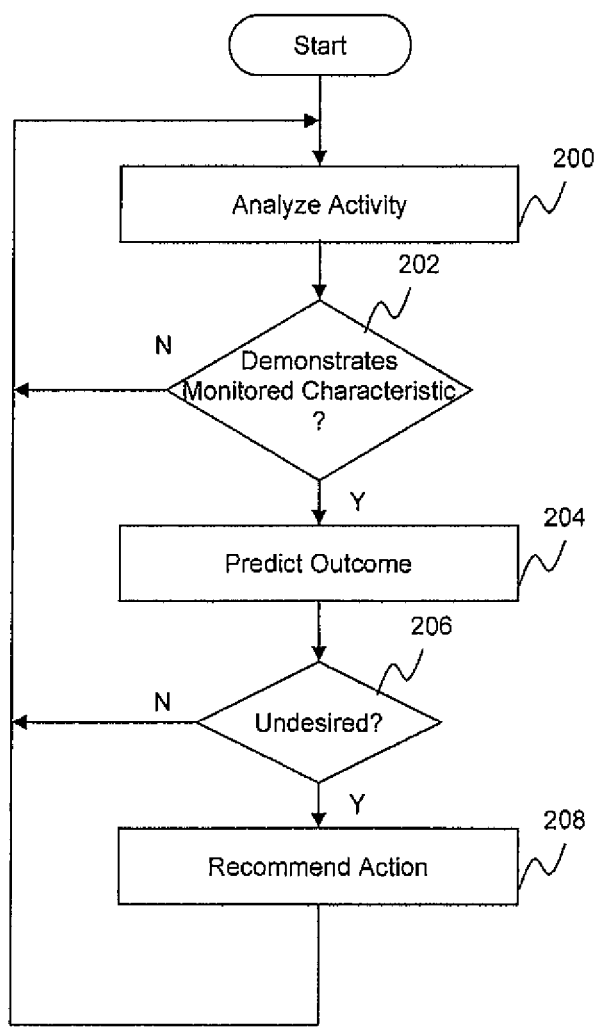
FIG. 4 is a flow diagram of a process executed by a recommendation server for recommending an action to a contact server according to one exemplary embodiment of the invention.

FIG. 4 is a flow diagram of a process executed by the recommendation server 40 for recommending an action to a contact server according to one exemplary embodiment of the invention. In step 200, the recommendation server 40 analyzes a particular activity of the contact center and determines, in step 202, whether the analyzed activity demonstrates a monitored characteristic, such as, for example, a particular customer satisfaction predictor.

If the answer is YES, the recommendation server proceeds to predict, in step 204, an outcome for the contact center. The prediction may be based, for example, on information and reference models in the knowledge base. For example, if the analysis of the activity for the contact center indicates that a call has been on hold for more than five minutes, the predicted outcome may be abandonment of the call. In another example, if a call has been transferred more than three times after being on hold for more than three minutes, the predicted outcome may be a low net promoter score. The net promoter score may indicate how likely the customer is to recommend the company to others.

In step 206, a determination is made as to whether the predicted outcome is undesirable. For example, a net promoter score below a particular threshold may be deemed to be undesirable. In another example, an abandoned call may be deemed to be undesirable.

If the answer is YES, the recommendation server 42 proceeds to recommend an action to remedy the situation. The recommended action may be a routing action for expediting, for example, the handling of the current call. In the example where a call is on hold for more than five minutes, the recommended action may be to increase the importance of the call and transfer the call to a next available agent with the highest possible skill. According to one exemplary embodiment, the recommended action may be implemented automatically.

According to one embodiment, prior to implementing a recommended action, a check or validation is performed, manually or automatically, that the suggested action is an improvement for the particular tenant. In the example of recommending a routing action that increases the importance of a call to transfer the call to the next available agent with the highest possible skill, the recommended action may not cause an improvement in routing interactions if the contact center is understaffed and/or agents are not sufficiently skilled. Thus, according to one embodiment, when it is detected that the recommended action is not likely to make an improvement in the current operation of the contact center, the recommendation may not be implemented.

According to one exemplary embodiment, the data gathered from monitoring configuration and interaction activities of various tenants in the remote computing environment may be leveraged for learning successful routing strategies and recommending such routing strategies to other contact centers.

Figure 5:
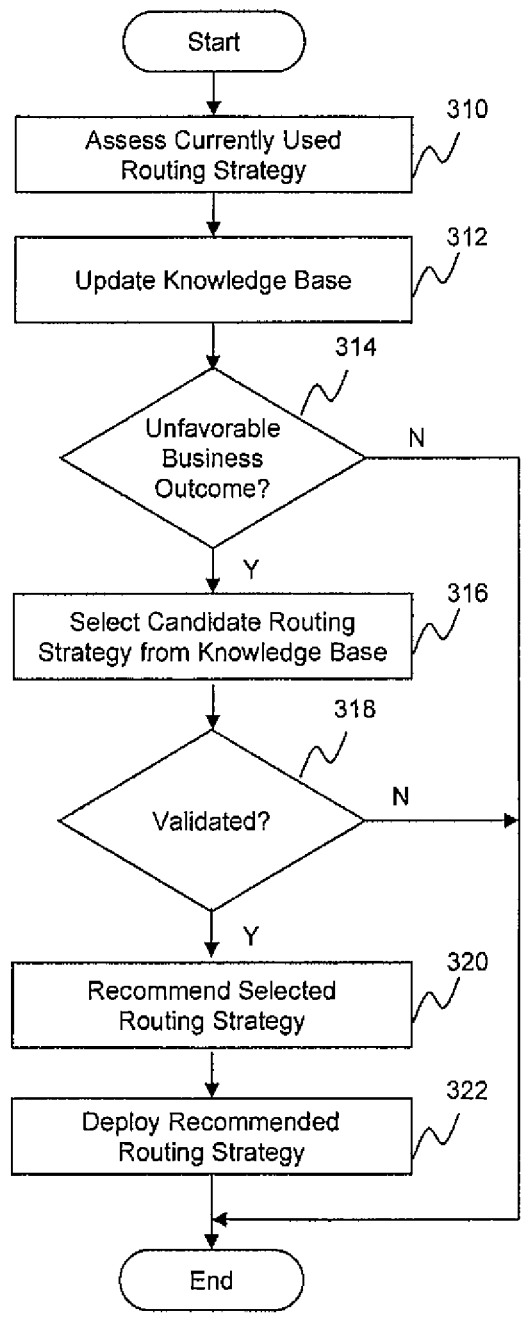
FIG. 5 is a flow diagram of a process for updating a knowledge base and recommending routing strategies to a contact center according to one embodiment of the invention.

FIG. 5 is a flow diagram of a process for updating a knowledge base and recommending routing strategies to a contact center according to one exemplary embodiment.

The process starts, and in step 310, the prediction/rating server 42 retrieves and assesses the current routing strategy employed by the contact center. For example, the assessment may entail retrieving and evaluating a log of past interaction data and identifying business outcomes that resulted from the logged interactions. The business outcomes may be logged in the same or different log file. The business outcomes may relate, for example, to sales that were made, customer survey results, and the like.

In step 312, the prediction/rating server 42 invokes its learning algorithm to update/optimize the knowledge base based on the observed data. The learning algorithm may observe the situations that led to good and bad business outcomes, and adjust input parameters to one or more reference models based on such observations. For example, the learning algorithm may learn that particular skills and/or skill levels result in successful business outcomes, such as, for example, successful cross/up sales, positive customer surveys, low abandonment rate, and the like. Learning may also be done based on other observations, such as, for example, a number of transfers, hold times, and the like.

In addition, learning may also be achieved based on bad business outcomes. If the business outcomes are negative, the machine learning algorithm may identify one or more causes for the negative outcome for incorporating this knowledge into the knowledge base.

In step 314, if the negative business outcome is detected, the recommendation server selects, in step 316, a candidate routing strategy from the knowledge base that is assumed to improve the business outcome. The candidate routing strategy may be selected based on one or more reference models in the knowledge base predicting the improved business outcome for the contact center.

In step 318, a determination is made as to whether the new routing strategy may be validated. In this regard, a simulation may be performed using prior interaction data where, according to the simulation, the prior interactions are routed according to the new routing strategy and business outcomes are measured or predicted based on the new routing strategy. The new routing strategy may be validated if the simulation results in an increase of the business outcome by a certain percentage.

In step 320, the recommendation server recommends a validated routing strategy.

The recommended routing may be deployed in step 322. The deployment may be manual in response to a command by a contact center administrator. The deployment may also be automatic. For example, the new routing strategy may be automatically selected by a routing server for routing a future interaction.

Although according to one exemplary embodiment routing strategies are recommended based on scores of similarly situated contact centers, a person of skill in the art should recognize that other configuration parameters or other rules and other types of business logic other than routing strategies may be recommended in addition or in lieu of routing strategies. In another exemplary embodiment, no recommendation may be made at all, but the contact center may be alerted if deviations are noted from similarly situated contact centers. The deviation may be, for example, deviation in routing strategies. For example, the recommendation server may detect that 20% of customer interactions are traveling across 20 or more routing points. The recommendation server may compare this data to data gathered for other similarly situated contact centers (e.g. contact centers having a similar size), and may simply flag the detected data as an anomaly or deviation from those contact centers.

The processes of FIGS. 3-5 may be described in terms of a software routine executed by one or more processors based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 6:
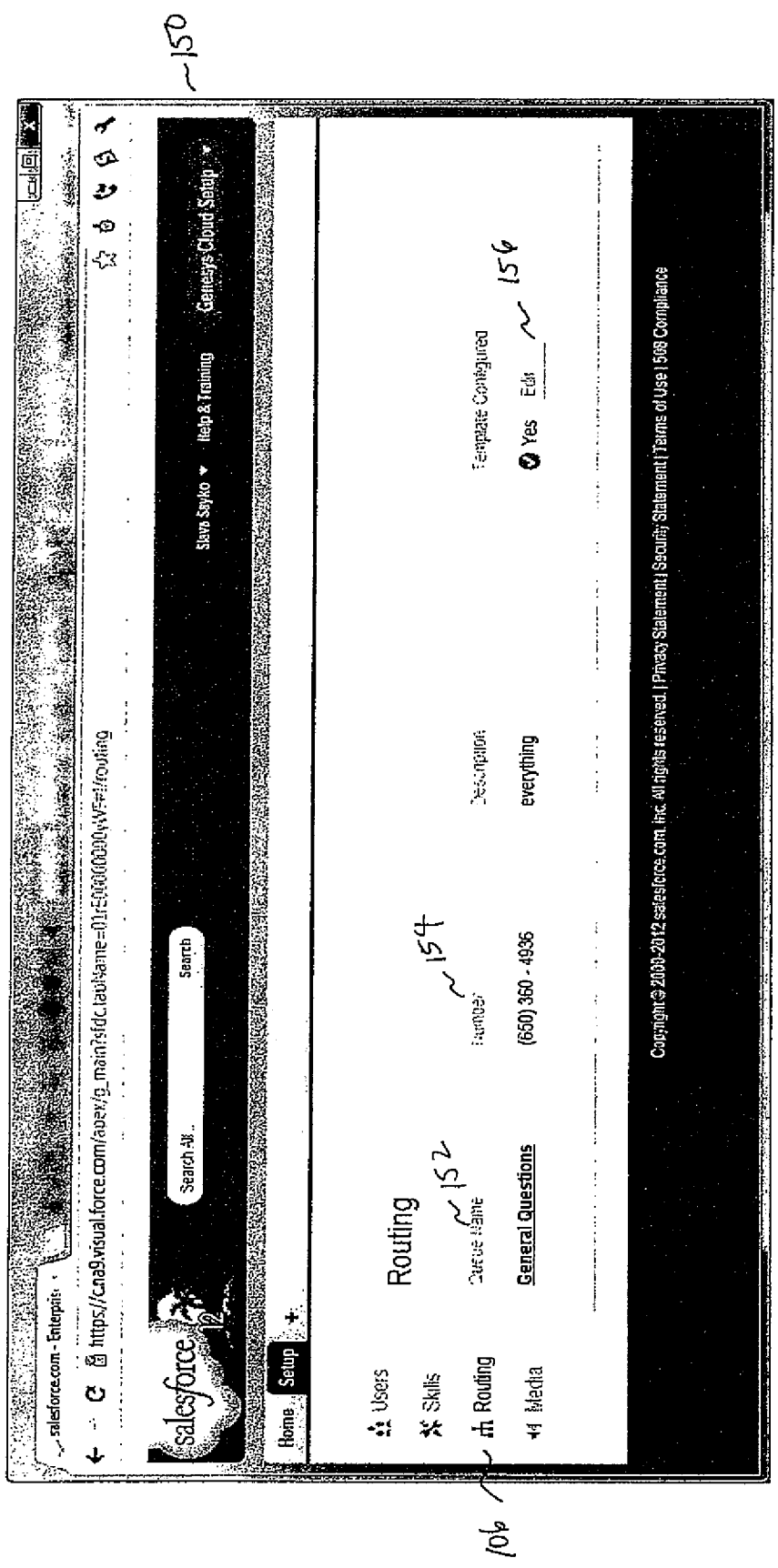
FIGS. 6-8 are screen shots of various example graphical user interface screens rendered by a specialized application running on a third party web platform according to one example embodiment of the invention.
Figure 7:
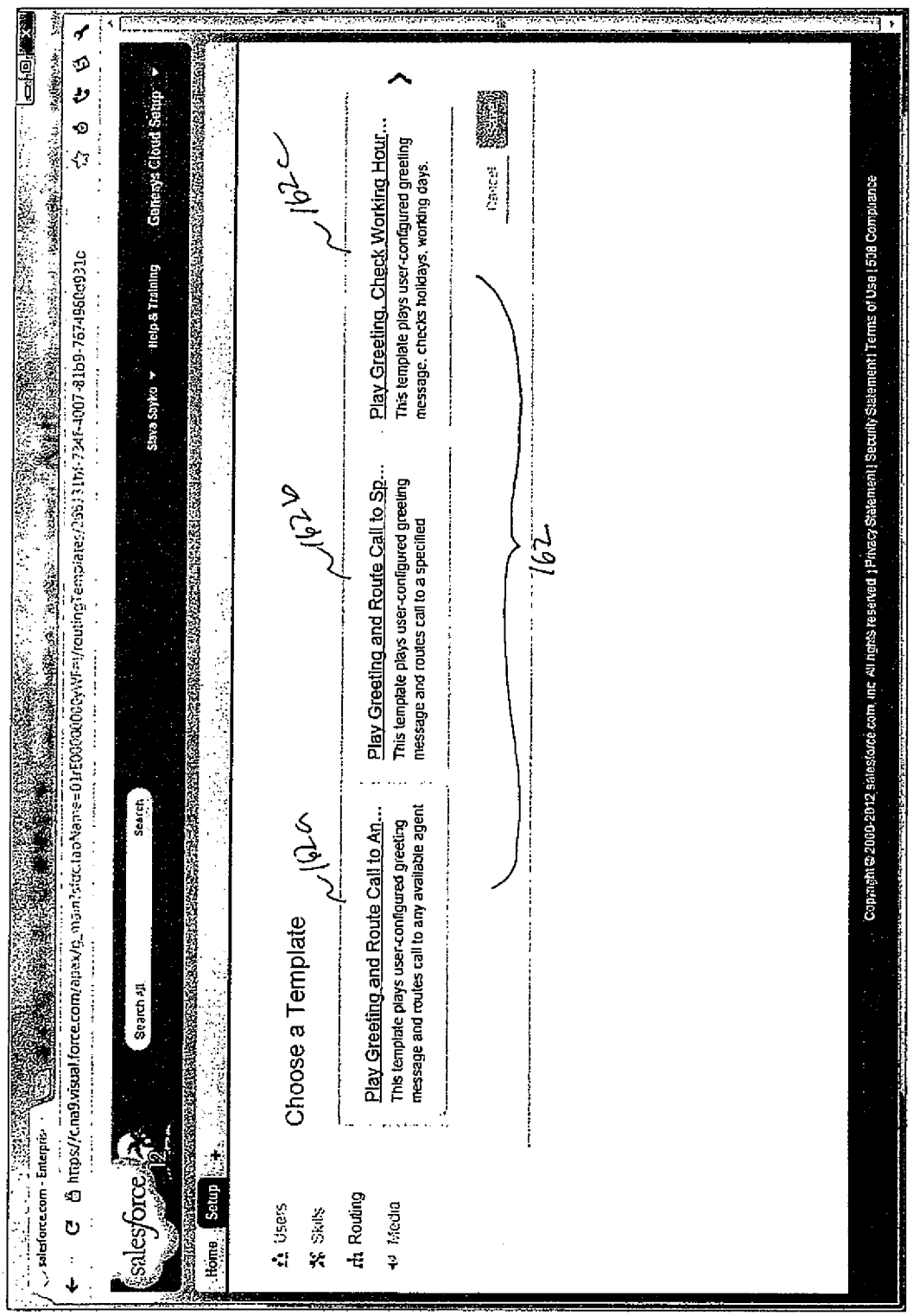
Figure 8:
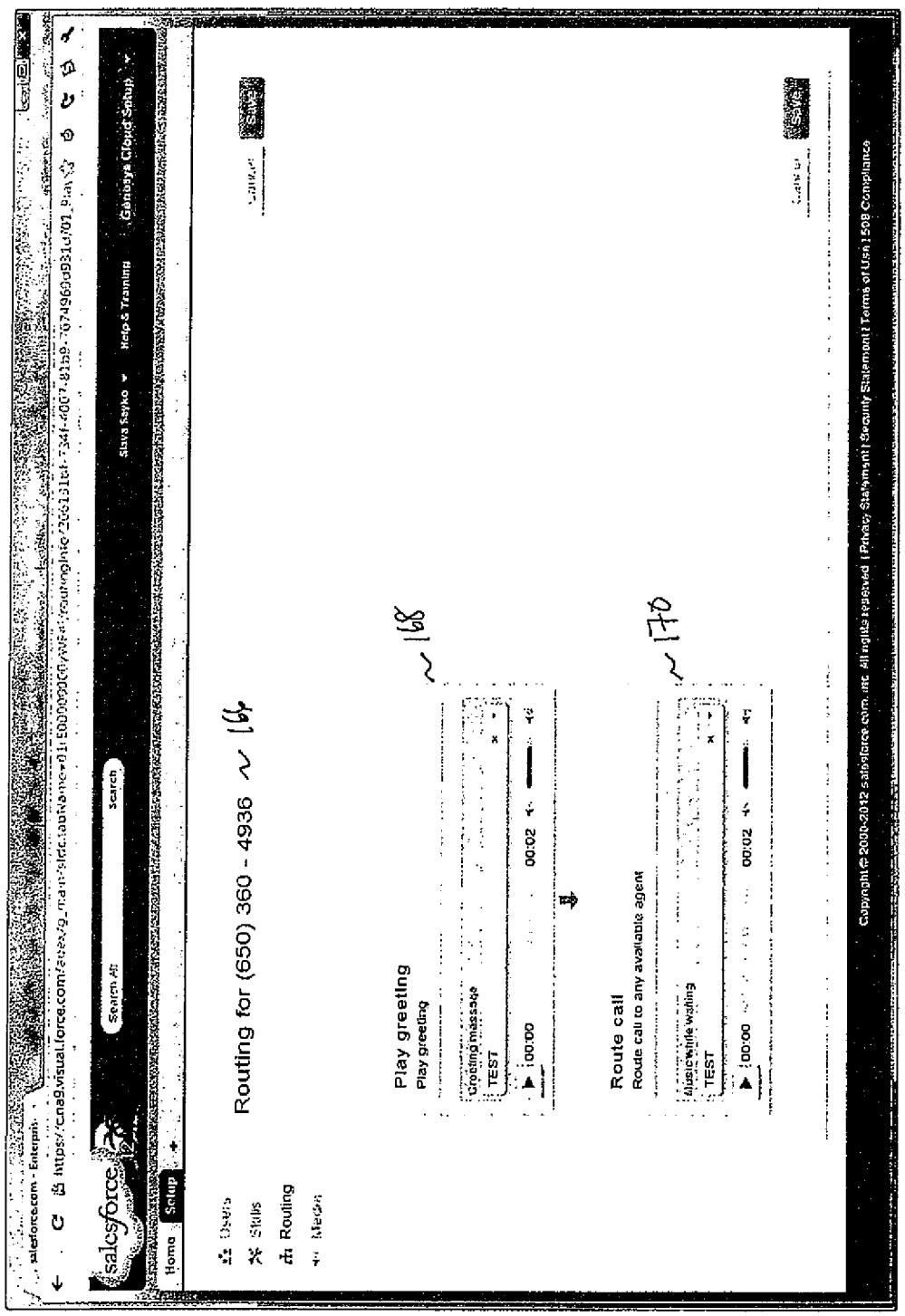

FIGS. 6-8 are screen shots of various example graphical user interface screens rendered by the specialized application running on the third party web platform 20 according to one example embodiment of the invention. A person of skill in the art should recognize that the graphical user interface may also be provided by the web server 44 in the remote computing environment 24 in instances where a tenant user accesses the web server 44 directly without invoking the third party web platform 20. According to one example embodiment, the graphical user interface may be used to recommend routing strategies to contact centers where the recommended routing strategies are selected based, for example, on the process described with respect to FIG. 5. The graphical user interface may also be used for guiding a contact center user step-by-step in configuring a recommended routing strategy according to the specific contact center's business needs. In this regard, when a contact center user 12 logs in and indicates that contact center setup is desired, the specialized application renders a UI page 100 with various options for configuring the contact center. Such options may include, for example, a user management option 102, skills management option 104, routing configuration option 106, and media management option 108.

FIG. 6 is a screen shot of a UI page 150 rendered upon selection of the routing option 106 according to one example embodiment of the invention. Selection of the routing option causes display of available routing points that may be selected for defining or redefining a routing logic for the routing point. In this regard, the routing point is an entry point to a contact center. All incoming end user 14 calls arrive at a particular routing point. According to one embodiment, a routing point is associated with a directory number 154. The routing point may also be associated with a name 152.

A contact center may have one or more routing points associated with it where each routing point is associated with a single phone number. For example, there may be several phone numbers that an end customer may call to reach the contact center. Each phone number may reach, for example, a different sub-unit of the contact center (e.g. credit card division, mortgage division, personal accounts division, and the like).

According to one example embodiment, each routing point is associated with a routing template, which in turn is associated with a routing strategy/logic. A drop down template box 156 allows an administrator to configure and/or reconfigure the routing strategy assigned to the routing point. Upon user indication to edit or assign a routing template to a particular routing point, the web server retrieves and displays one or more templates for the administrator's selection.

FIG. 7 is a screen shot of a UI page 160 displaying a plurality of different routing templates 162 available for selection by a administrator according to one example embodiment of the invention. According to one example embodiment, the routing templates that may initially be displayed for user selection are based on the routing strategy recommended for the contact center via the process of FIG. 5. Different templates with different routing complexities may be recommended and displayed. In the example of FIG. 7, the template with least complexity is template 162a where a call is routed to any available agent after playing a user-configured greeting, followed by templates 162b and 162c. Template 162b routes a call to a specified agent, and template 162c checks holidays, working days, and the like, prior to routing a call, and hence, is more complex that template 162b.

According to one example embodiment, a routing template is parameterized. In this regard, a routing template uses values of parameters to accomplish a specific action. For example, when an initial voice treatment is played to a calling end customer, the actual URI (Uniform Resource Identifier) of the media file is a value of one of the parameters of the template. As another example, when call is routed to an agent having a particular skill, the actual skill name is a value of another parameter of the template.

Routing templates are generic. The same routing template may be used by any of various contact centers hosted by the remote computing environment. The templates may also be designated for particular industry verticals only. For example, the set of templates available to the banking industry may be different from the templates available to the hospitality industry. Because routing templates use parameters, different customers using the same routing template can specify different values for the parameters, customizing how their calls are processed.

According to one example embodiment of the invention, a routing template includes the following properties:
  id;
  name;
  description;
  routingStrategy—SCXML (State Chart Extensible Markup Language) strategy;
  templateSchema—a schema (also referred to as metadata) describing what parameters this template uses and defines additional information about parameters (e.g. type). It is also used to generate the appropriate UI so users can conveniently specify values of routing parameters during the contact center's configuration process.

The metadata for a particular routing template defines parameters. According to one example embodiment, a parameter object has the following properties:
  displayName—parameter name to be displayed in the UI;
  description—brief description of the parameter;
  type—parameter type, must be one of the types specified (e.g. a "timezone" type to describe a time zone of the contact center; a "holiday" type to describe holiday dates; a "weekdays" type to describe weekday sequences; a "working hours" type to specify working hours; a "media resource" type to describe audio, video, etc. to be used in the routing process; a "destination" type to describe a routing destination (e.g. skill, agent, etc.); and a "select action menu" type that describes an action to be performed by the routing strategy);

multiple—a Boolean value describing if this parameter is an array or not; "true" means that this parameter can hold several objects of the specified type.

According to one example embodiment, metadata for a particular routing template may also define an element referred to as "block" which is a logical grouping element for a set of parameters which have something in common. Blocks may also form a tree-like structure by having a number of child blocks. Thus, metadata for a particular routing template may be described as an array of blocks.

According to one example embodiment, each block has the following JSON (JavaScript Object Notation) representation:

block—name of this block;
type—block type, can be one of the following: "simple", "condition", "menu", "menuItem";
displayName—block name to be displayed in the UI;
description—brief description;
params—an object containing a set of user-configurable parameters to be displayed in this block; shall be in the following format: {<parameter1_name>: <parameter1_spec>, <parameter2_name>: <parameter2_spec>, . . . };
blocks—an array of child blocks (optional).

FIG. 8 is a screen shot of a UI page 165 displaying parameters for a selected routing template 162a based on the associated metadata according to one example embodiment of the invention. The set of parameters that are displayed depends from the functionality that the template provides. In the illustrated example, the parameters include a play greeting parameter 168 and a route call parameter 170. In response to the displayed parameters, the contact center administrator selects a pre-recorded greeting message to be played when a call is initially answered, and music to be played while the call is waiting to be routed to an available agent. Other parameters may relate to selecting a voice prompt to play at a specific step of processing a call, or specifying an action to take when a particular digit is entered from the user's telephone device.

The parameters in the UI page 165 of FIG. 8 are rendered based on the following metadata:

```
[{
    "block": "greeting",
    "type": "simple",
    "displayName": "Play greeting",
    "description": "Play greeting",
    "params": {
        "greetingMessage": {
            "displayName": "Greeting message",
            "description": "Select greeting message",
            "type": "media",
            "multiple": false
        }
    }
},{
    "block": "routing",
    "type": "simple",
    "displayName": "Route call",
    "description": "Route call to any available agent",
    "params": {
        "musicWhileWaiting": {
            "displayName": "Music while waiting",
            "description": "Select music while waiting",
            "type": "media",
            "multiple": false
        }
    }
}]
```

The values of the parameters that are stored based on inputs provided in response to the parameters displayed in FIG. 8 may be as follows:

```
routingParams = {
    "greetingMessage": {
        "id": "f3ab8s-484556",
        "displayName": "Greeting Message",
        "uri": "system/media-resources/f3ab8s-484556",
        "mediaUri": "system/media-resources/f3ab8s-484556.wav"
    },
    "musicWhileWaiting": {
        "id": "f3ab8s-484556",
        "displayName": "Music While Waiting",
        "uri": "system/media-resources/f3ab8s-484556",
        "mediaUri": "system/media-resources/f3ab8s-484556.wav"
```

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. A method for recommending routing strategies to contact centers, the method comprising:
identifying, by a processor, one or more customer satisfaction predictors;
monitoring, by the processor, activities associated with a plurality of contact centers, and identifying outcomes of the activities;
updating, by the processor, a machine learning model stored in a knowledge base based on the monitored activities, the identified outcomes of the activities, and the identified customer satisfaction predictors;
assessing, by the processor, a particular outcome produced in response to invoking a current routing strategy for processing a particular interaction for a particular contact center;
in response to the assessing, automatically selecting a candidate routing strategy from the knowledge base based on the updated machine learning mode;
testing the selected candidate routing strategy with the particular interaction;
in response to the testing, recommending the candidate routing strategy for the contact center, wherein the recommended candidate routing strategy includes computer instructions for controlling routing of a future interaction to a resource of the particular contact center; and
establishing, by an edge device, a communication session between the resource and a particular end user device based on execution of the computer instructions.

2. The method of claim 1, wherein the monitored activities are customer interactions handled by the plurality of contact centers.

3. The method of claim 1, wherein the monitored activities include an amount of time a call is put on hold prior to being routed to an agent.

4. The method of claim 1, wherein the monitored activities include a number of transfers made during a call.

5. The method of claim 1, wherein the particular outcome is feedback from a customer associated with the particular interaction indicative of lack of satisfaction by a customer associated with the particular interaction.

6. The method of claim 1, wherein the particular outcome is abandonment of the call.

7. The method of claim 1, wherein the updating includes adjusting parameters to the machine learning model based on the monitored activities.

8. The method of claim 1 further comprising:
deploying the recommended routing strategy in response to a user command.

9. The method of claim 1 further comprising:
automatically deploying the recommended routing strategy.

10. A machine learning system for contact center use, the machine learning system comprising:
one or more processors; and
one or more memory devices coupled to the one or more processors and having program instructions stored therein, the one or more processors being configured to execute the program instructions, the program instructions comprising:
identifying one or more customer satisfaction predictors;
monitoring activities associated with a plurality of contact centers, and identifying outcomes of the activities;
updating a machine learning model stored in a knowledge base based on the monitored activities, the identified outcomes of the activities, and the identified customer satisfaction predictors;
assessing a particular outcome produced in response to invoking a current routing strategy for processing a particular interaction for a particular contact center;
in response to the assessing, automatically selecting a candidate routing strategy from the knowledge base based on the updated machine learning mode;
testing the selected candidate routing strategy with the particular interaction; and
in response to the testing, recommending the candidate routing strategy for the contact center, wherein the recommended candidate routing strategy includes computer instructions for controlling routing of a future interaction to a resource of the particular contact center; and
an edge device coupled to the one or more processors configured to establish a communication session between the resource and a particular end user device based on execution of the routing instructions.

11. The system of claim 10, wherein the monitored activities are customer interactions handled by the plurality of contact centers.

12. The system of claim 10, wherein the monitored activities include an amount of time a call is put on hold prior to being routed to an agent.

13. The system of claim 10, wherein the monitored activities include a number of transfers made during a call.

14. The system of claim 10, wherein the particular outcome is feedback from a customer associated with the particular interaction indicative of lack of satisfaction by a customer associated with the particular interaction.

* * * * *